(12) United States Patent  
Harada et al.

(10) Patent No.: US 8,874,602 B2  
(45) Date of Patent: Oct. 28, 2014

(54) RANDOM NUMBER GENERATOR IN A MPP DATABASE

(71) Applicant: Pivotal Software, Inc., Palo Alto, CA (US)

(72) Inventors: Hitoshi Harada, Foster City, CA (US); Caleb Welton, Foster City, CA (US); Florian Schoppmann, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 48 days.

(21) Appl. No.: 13/631,923

(22) Filed: Sep. 29, 2012

(65) Prior Publication Data

US 2014/0095526 A1   Apr. 3, 2014

(51) Int. Cl.  
*G06F 17/30* (2006.01)

(52) U.S. Cl.  
USPC .......................................... 707/764; 707/692

(58) Field of Classification Search  
CPC ................. G06F 17/30445; G06F 17/30386  
USPC ................................................ 707/692, 764  
See application file for complete search history.

(56) References Cited

U.S. PATENT DOCUMENTS

| | | | |
|---|---|---|---|
| 5,793,657 A | | 8/1998 | Nemoto |
| 5,878,426 A | | 3/1999 | Plasek et al. |
| 6,889,221 B1 | * | 5/2005 | Luo et al. ............................ 1/1 |
| 2005/0131893 A1 | * | 6/2005 | Von Glan ......................... 707/5 |
| 2007/0294508 A1 | | 12/2007 | Sussman et al. |
| 2009/0077011 A1 | * | 3/2009 | Natarajan et al. ................ 707/2 |
| 2009/0132488 A1 | * | 5/2009 | Wehrmeister et al. ........... 707/3 |
| 2011/0153662 A1 | | 6/2011 | Stanfill et al. |

OTHER PUBLICATIONS

Coddington, "Random Number Generators for Parallel Computers," Syracuse University, Apr. 1997, 26 pages.

Gentle, "Simulating Random Numbers from a Uniform Distribution," *Random Number Generation and Monte Carlo Methods* (Second Edition), 2005, Chapter 1, 1-56.

International Search Report and Written Opinion in International Application No. PCT/US2013/062498, mailed Jan. 31, 2014.

Schoppmann, "Generating psuedo-random numbers in parallel using random ( )," *Confluence*, retrieved on Sep. 17, 2012, http://confluence.greenplum.com/display/~schopf/2012/04/24/Generating+pseudo-random+numbers+in+parallel+using+random%28%29, 2 pages.

* cited by examiner

*Primary Examiner* — Etienne Leroux  
*Assistant Examiner* — Cindy Nguyen  
(74) *Attorney, Agent, or Firm* — Fish & Richardson P.C.

(57) ABSTRACT

A random number generation process generated uncorrelated random numbers from identical random number sequences on parallel processing database segments of an MPP database without communications between the segments by establishing a different starting position in the sequence on each segment using an identifier that is unique to each segment, query slice information and the number of segments. A master node dispatches a seed value to initialize the random number sequence generation on all segments, and dispatches the query slice information and information as to the number of segments during a normal query plan dispatch process.

20 Claims, 7 Drawing Sheets

Seg1

| id | category | price | random | [predicate] |
|---|---|---|---|---|
| 1 | A | 500 | 0.3439 | TRUE |
| 2 | B | 900 | 0.7839 | FALSE |
| 3 | A | 800 | 0.215 | TRUE |

Seg2

| id | category | price | random | [predicate] |
|---|---|---|---|---|
| 4 | C | 700 | 0.5193 | FALSE |
| 5 | A | 600 | 0.1139 | TRUE |
| 6 | B | 500 | 0.8799 | FALSE |

| 1 | 2 | 3 | 4 | 5 | 6 | 7 |
|---|---|---|---|---|---|---|
| 0.3495 | 0.5943 | 0.7981 | 0.9932 | 0.243 | 0.3321 | 0.883 |
| p1 | p2 | p1 | p2 | p1 | p2 | p1 |

RANDOM NUMBER GENERATOR IN A MPP DATABASE

BACKGROUND

This invention relates to random number generation in parallel processes, and more particularly to random number generation in massively parallel processing (MPP) systems such as databases.

Random number generators are used in many applications. They use iterative deterministic algorithms for producing a sequence of pseudo-random numbers that approximate a random sequence. It is important that the generators have good randomness properties and that the sequence be uniformly distributed, uncorrelated, reproducible and easily changed by adjusting an initial seed value. Parallel random number generators running on parallel processors in a distributed system, such as a MPP database, in addition should produce the same sequence on different processors, have no correlation between the sequences, and produce good quality random numbers. MPP database systems require good quality random numbers for analytic workloads such as Monte Carlo simulation and for random sampling of physical tables. Obtaining random numbers that satisfy these requirements from parallel computers is difficult, particularly in MPP databases where the number of nodes that process a query is not known in advance, and where communications between processors is impractical.

In a distributed database system, if each segment node initializes with the same seed and the processes pick up the sequence numbers at the same positions, the random numbers will be the same and are not of good quality. On the other hand, if each segment node starts with different seed values and thus generates different sequences, the returned values of the random numbers may overlap each other so that the quality is unpredictable, which is unacceptable. It is important to ensure that the segments of the MPP database generate the same sequence but return different numbers at the different positions in the sequence on different segments. It might be possible to accomplish this if the segments were able to communicate with one another. However, this is not feasible in an MPP database where low latency is essential and there may be thousands of segments.

It is desirable to provide random number generators for MPP databases that address the foregoing and other known problems of generating quality random numbers and distributed processing systems, and it is to these ends that the present invention is directed.

DESCRIPTION OF PREFERRED EMBODIMENTS

The invention is particularly well suited to massively parallel processing (MPP) databases, such as shared-nothing databases, and will be described in that context. However, as will be appreciated, this is illustrative of only one utility of the invention, and the invention is applicable to parallel processing or generally.

Figure 1:
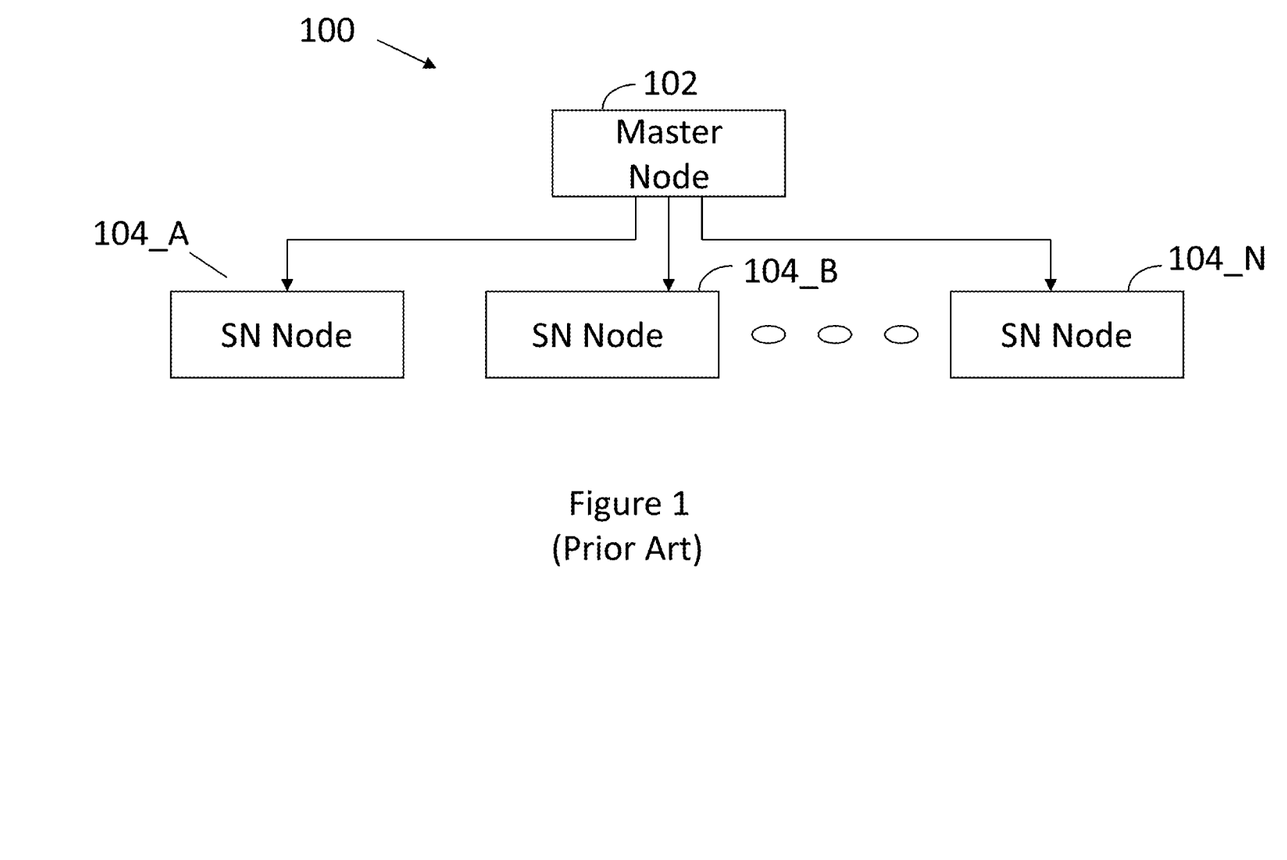
FIG. 1 is a block diagram of an MPP shared-nothing database system of the type with which the invention may be employed.

FIG. 1 illustrates a shared-nothing database system 100 of the type with which the invention may be employed. As shown, the system 100 may include a master node 102 and a set of shared-nothing nodes or segments 104_A through 104_N. Each shared-nothing segment 104 may have its own processor(s), local memory, disks and input/output devices and operate independently of other segments in the system. Each node may be self sufficient, sharing nothing across the network. Therefore, there are no points of contention across the system and no sharing of system resources. The advantage of this architecture is that it is highly scalable.

Figure 2:
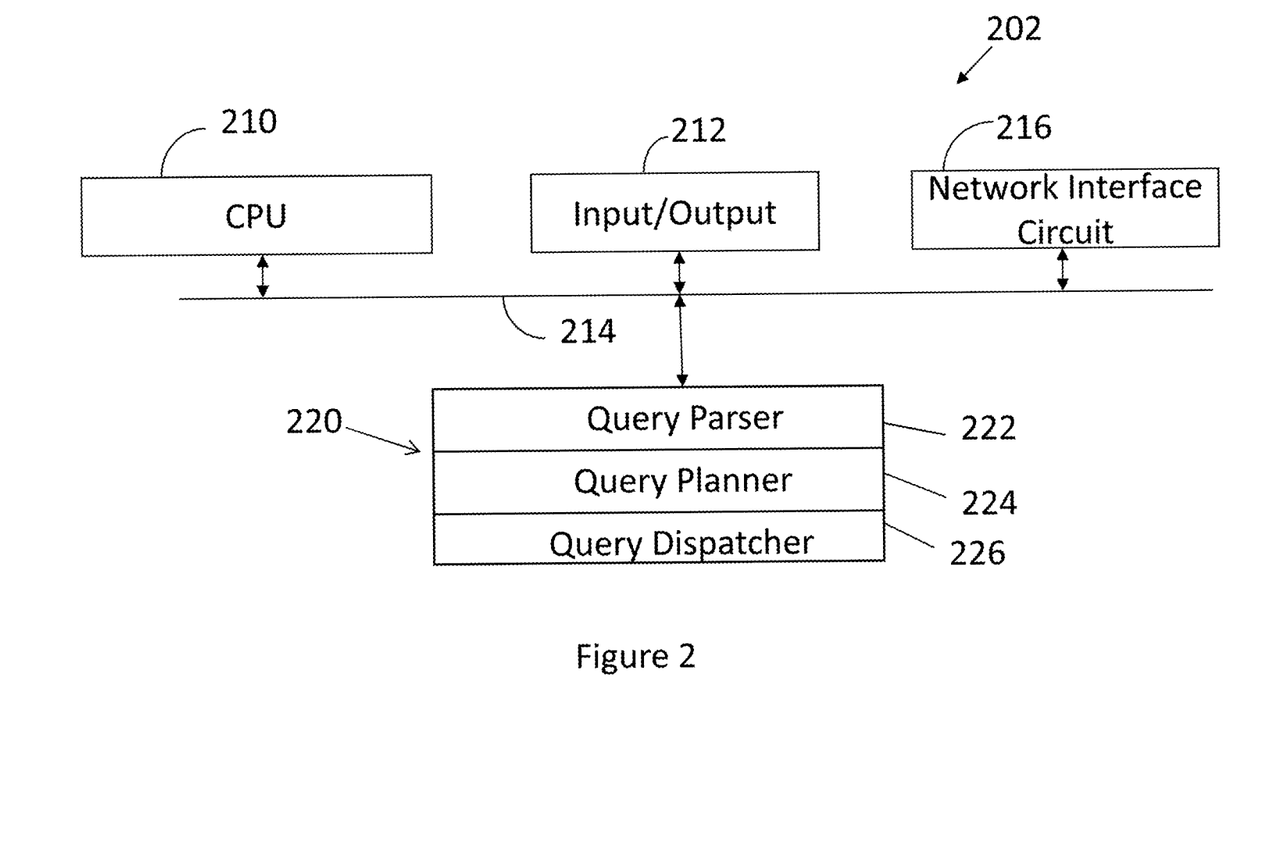
FIG. 2 is a block diagram illustrating the architecture of a master node of the database system of FIG. 1.

FIG. 2 illustrates the architecture of a master node 202 of the database system 100 that is configured to implement operations in accordance with the invention. The master node 202 may includes standard components, such a processor or CPU 210, which may comprise a multi-CPU processor. The CPU may be connected to input/output devices 212 via a bus 214. The input/output devices 212 may include standard components, such as a keyboard, mouse, display, printer and the like. A network interface circuit 216 may also be connected to the bus 214, allowing the master node 202 to operate in a networked environment.

A memory 220 may also be connected to the bus 214. The memory 220 comprises computer readable media that stores executable instructions that control the operation of the computer to implement embodiments of the invention. The instructions afford, for example, a query parser 222 that interprets a database query, checks for correct syntax, and builds a data structure (e.g., a tree) to represent the query. The memory may also store instructions that afford a query planner or query optimizer 224. The query planner 224 processes the output from the query parser and develops a query plan to execute the query. A query plan specifies a set of operations that are used to access or modify the data associated with the query. Details, such as how to access a given data relation, in which order to join data relations, sort orders, and so on, may form part of a query plan. For a given query, a large number of query plans may be generated. A query optimizer may evaluate the costs of all possible query plans for a given query and determine the optimal, i.e., most efficient plan for executing the query. Once a query plan is selected, it is passed to the query dispatcher 226 which deploys the query plan across a set of shared nothing nodes for execution.

The segment nodes 104 may have architectures similar to the master node, except that they have data stores, such as disk drives, that constitute a local database, and need not have instructions that provide a query parser, query planner or query dispatcher. Instead, their memories will store instructions for executing the operations specified by the query plan on their individual databases, and for returning the results to the master node.

Figure 3:
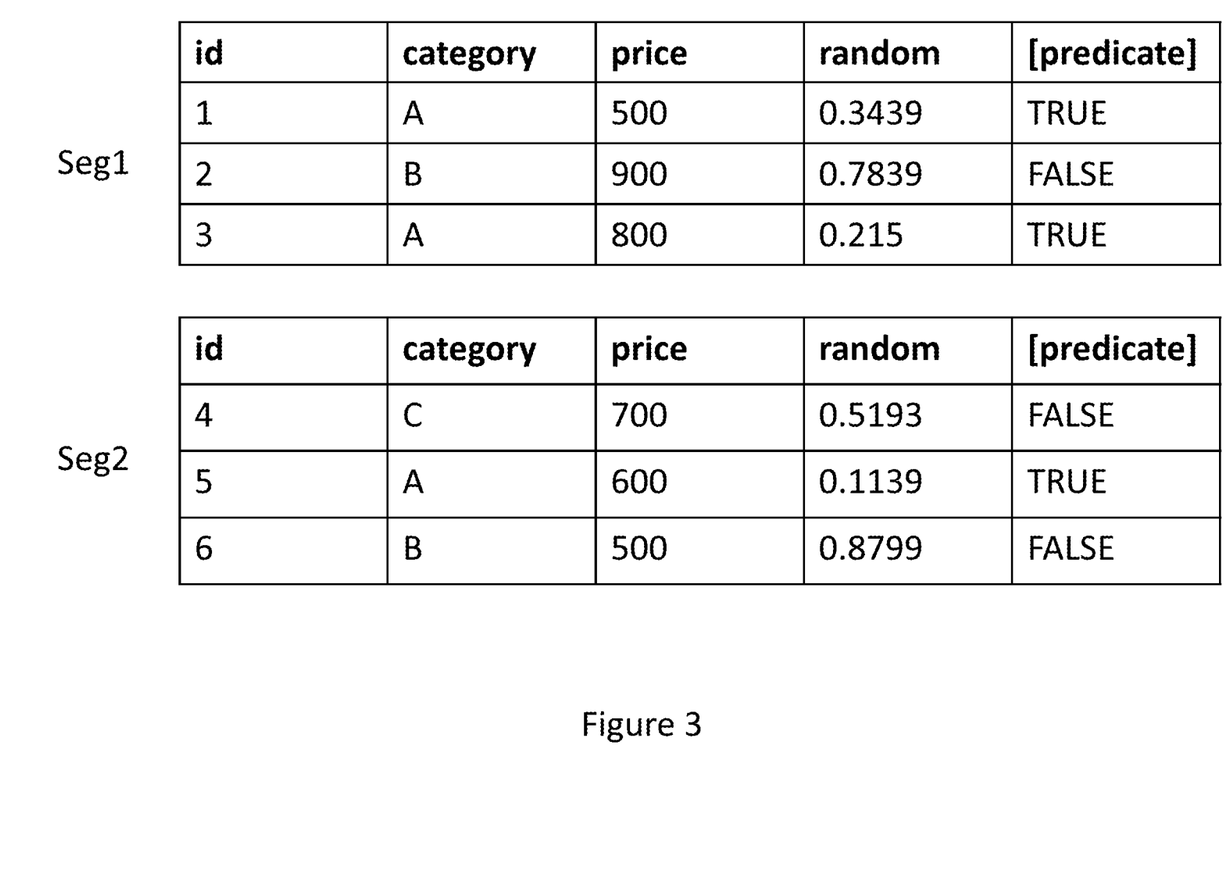
FIG. 3 is a diagrammatic view illustrating random row sampling on tables in different segments.

FIG. 3 is a diagrammatic view that illustrates the operation of a SQL random( ) operation in obtaining uniformly distributed random values across separate processes. The figure illustrates random row sampling on a table where each row has an identifier ("id") and lists data that includes a category and a price. As shown, the table in this example has six rows which are split between two different segments. As indicated in the figure, a first segment, Seg. 1, includes three rows, row id's 1-3 of the table, and a second segment, Seg. 2, includes row id's 4-6 of the table. For a query:

SELECT id, category, price, random( ) FROM tbl WHERE random( ) <0.5 and assuming that the random( ) operation produces the random values for each row as shown in the tables, the predicate of the query is true for rows 1, 3 and 5, as indicated in the figure, since these rows have random values less than 0.5. Thus, the query will return the data in these three rows.

In order to achieve maximum parallelism for complicated queries during query execution, the master node may divide a query plan into slices and assign a process to each subdivided slice of the query plan on a segment node. A slice is a portion of the query plan that can be worked on independently at the segment level. Each slice is executed on all segments, and has an associated process on each segment. A query plan may be sliced, for instance, whenever a motion node occurs in the plan. A motion node is a portion of a query execution plan that indicates data movement between database instances (between segments and between segments and the master node).

Figure 4:
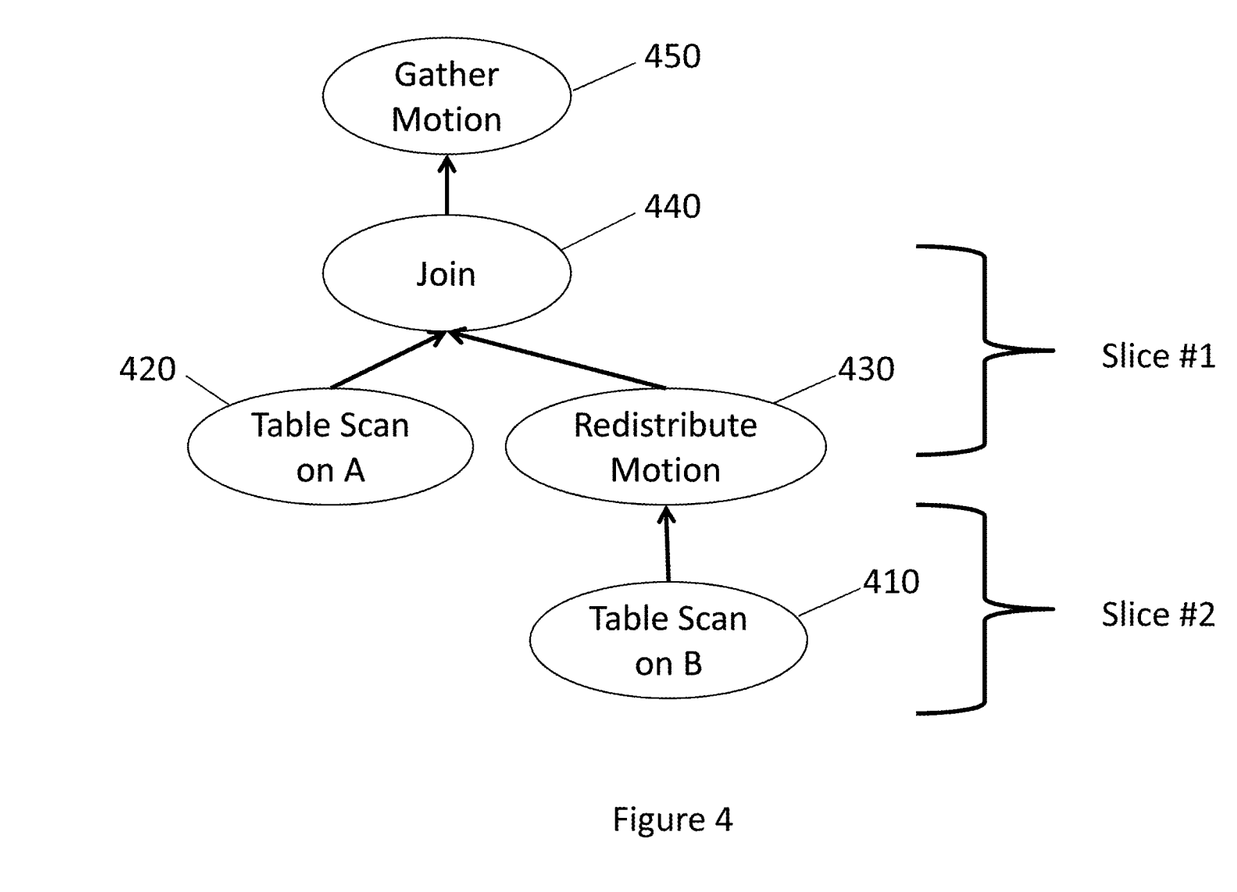
FIG. 4 is a diagrammatic view illustrating the partitioning of a query plan for a complex query into slices.

FIG. 4 illustrates an example of the partitioning of a query plan 400 by the master node into two slices Slice #1 and Slice #2. Assume that the query plan 400 involves a table scan 410 on a table B, a table scan 420 on a table A, a redistribute motion operation 430 on the results of the scan on table B to align the distribution of the returned data to match the distribution on table A, a join operation 440 to join the results of the scan 420 on table A and of the redistribute motion operation 430, and a gather motion operation 450 to gather the results of the join operation 440 from the segments on the master. The query plan 400 may be subdivided into two slices for execution, as previously described. Slice #2 may comprise the table scan 410 on table B, and Slice #1 may comprise the table scan 420 on table A, the redistribute motion operation 430, and the join operation 440. In practice, the master node will dispatch the slices to all segments in a cluster for execution as a separate process on each segment.

As described above, when executing a random operation on different segments of a MPP distributed database it is important to obtain uniformly distributed uncorrelated random values across the separate segments. Preferably, each segment that executes a random( ) process generates the same random sequence that is pre-selected in order to afford uncorrelated random values of a desired quality. Causing each segment to produce the same sequence is achieved by starting with the same initialization seed value for the random number generator on each segment. The problem is ensuring that the independent random values returned on the different segments of the cluster of the distributed database do not collide or correlate. Addressing this problem is difficult in a distributed parallel processing environment. One approach to minimizing correlation and collision in parallel processors which generate the same sequence is to stagger the starting points of the random number sequence and to appropriately select of the sequence step size at which random number values are selected based upon the number of different processes. Unfortunately, the number of processes is not known in advance and cannot be pre-selected and fixed since this depends upon the query plan. Furthermore, in a large MPP distributed database having many segments, it is impractical for the processors in the segments to communicate with one another in order to coordinate starting points and step sizes, particularly so where the number of processors that process a given query is not known in advance.

The invention addresses this problem, as will be described, by communicating certain information from the master node to the segments which the segments use to initialize and their random number generators. This information ensures that the random number sequence generated by each segment processor is identical among the segments, and also that the sequence is unique and different for each different query so that the random( ) operations for different queries are uncorrelated. The master also communicates further information to the segments that each segment combines with segment-specific information that is specific to and already available each segment, such as a unique segment identifier, to determine a different starting position in the random number sequence at that segment. The master additionally communicates information to the segments that determines the step size in the random number sequence used by the segments. Thus, each segment generates an identical random number sequence for a particular query having a starting position on the segment that is different from the starting position on other segments, but each segment has the same step size in the sequence. As a result, the random numbers returned at each segment are independent random values of good quality and consistency that have a little or no probability of collision or correlation. The way in which the invention accomplishes this is described below.

Figure 5:
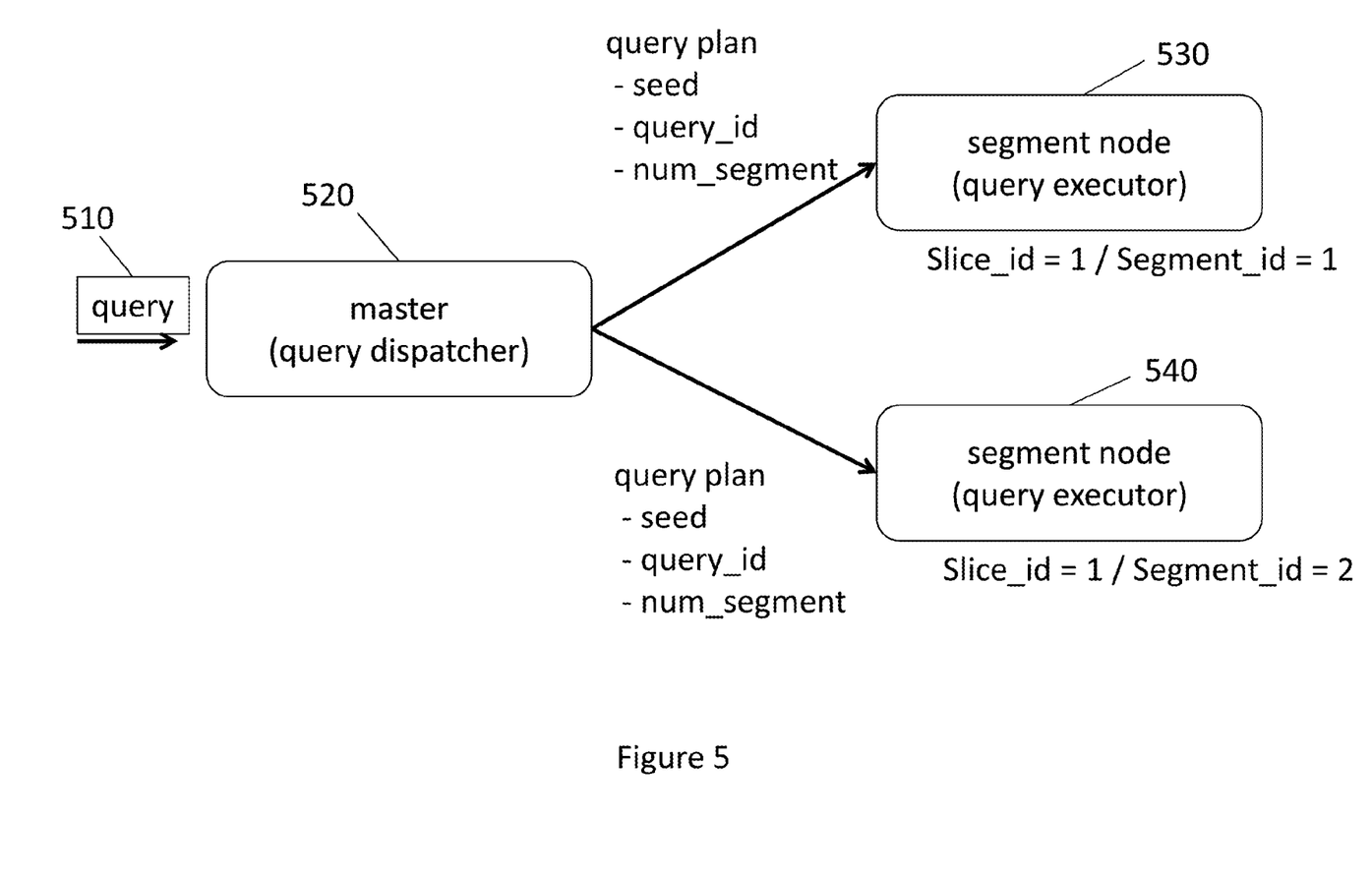
FIG. 5 is a diagrammatic view illustrating the distribution of the slices of a query plan to different processing segments.

FIG. 5 is a diagrammatic view that illustrates the distribution of slices of a query plan to different segments of the MPP database, and shows the types of information that is dispatched by the master node to each segment node. As indicated in the figure, a query 510 received by the master node 520 is processed by a query parser and a query planner to generate a query plan, as previously described in connection with FIG. 2. The query dispatcher of the master node dispatches the query plan the segments of the database cluster. For purposes of illustration and ease of description, it is assumed in this example that they are two query executor segment nodes or segment workers, i.e., segment 1, 530, and segment 2, 540, and that the query plan is sliced to produce a slice that involves generation of a random number sequence. As shown in FIG. 5, the slice may be given a slice identifier, slice_id=1 by the master node, and the tow segments may have segment identifiers segment_id=1, and segment_id=2. The query dispatcher on the master node 520 dispatches the query plan to the two segment nodes 530 and 540. In addition to the query plan, the master node may also dispatch to each segment a selected seed value which is used by the two segment nodes for generating the same random number sequence at each segment node, a query identifier (query_id) that identifies the query 510, and a value corresponding to the number of segment nodes (num_segment) that process the query. Since the master knows the degree of parallelism in the query plan, it knows the number of slices and the number of segments (num_segment) that process a slice. Each segment node thus has a slice process identifier, slice_id, that identifies a particular slice of the query plan, and a unique segment identifier. In this example, there are two segment nodes 530 and 540 having segment identifiers (segment_id) segment_id=1 and segment_id=2, respectively, and one slice having a slice identifier slice_id=1, as shown.

Figure 6:
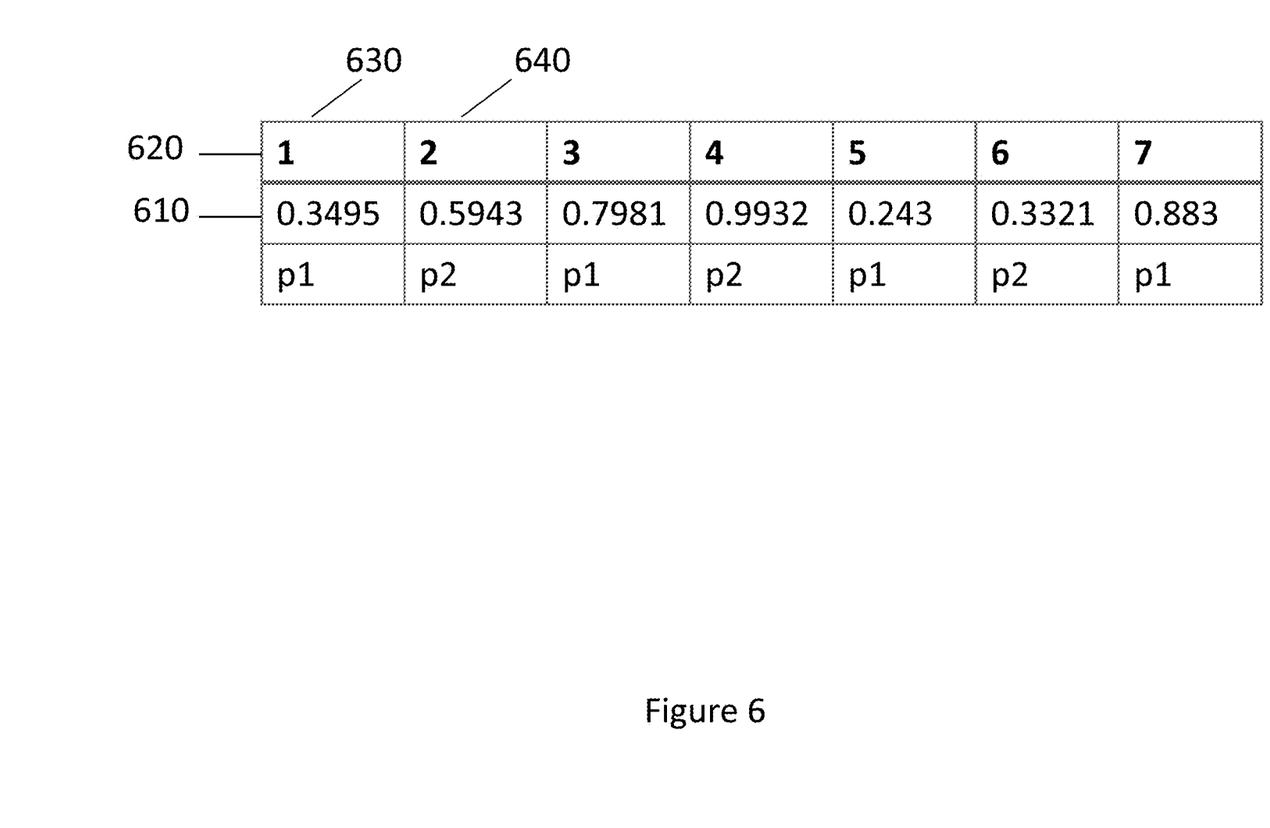
FIG. 6 is a diagrammatic view illustrating the random generator sequence initialization on the processing segments of FIG. 5.

FIG. 6 illustrates a random number generation sequence initialization process in accordance with the invention. Slice 1 has corresponding processes, p1 and p2, respectively, on the two segments nodes 530, segment_id=1, and 540, segment_id=2. Each process has a (seed, query_id) identifier and calls an operator setseed(seed<<16|query_id) to generate identical random number sequences having sequence values 610 as indicated in FIG. 6. The starting position 620 on each segment may be established by using the slice identifier, Slice_id, and the segment identifier, Segment_id that identifies the segment. The starting position (pos) 620 of the random number sequence on each segment may be determined in accordance with an embodiment using the slice identifier, the number of segments, and the segment identifier in a relationship:

$$pos=(slice\_id-1)*num\_segment+segment\_id$$

For slice_id=1 and two segments (num_segment=2), from the above relationship the starting position for selecting a random number in the sequence 620 on the first segment (segment_id=1) for process p1 corresponding to slice_id=1 is pos=1, as indicated at 630 in FIG. 6. Likewise, the starting position in the random number sequence on the second segment (segment_id=2) for the first slice using the above relationship is pos=2, as indicated at 640. Thus, the starting position in the random sequence on each segment is determined by query identifier information (slice_id), information as to the number of segments to which the query plan is dispatched from the master, and by specific segment identifier information that is unique to and available at each segment.

Figure 7:
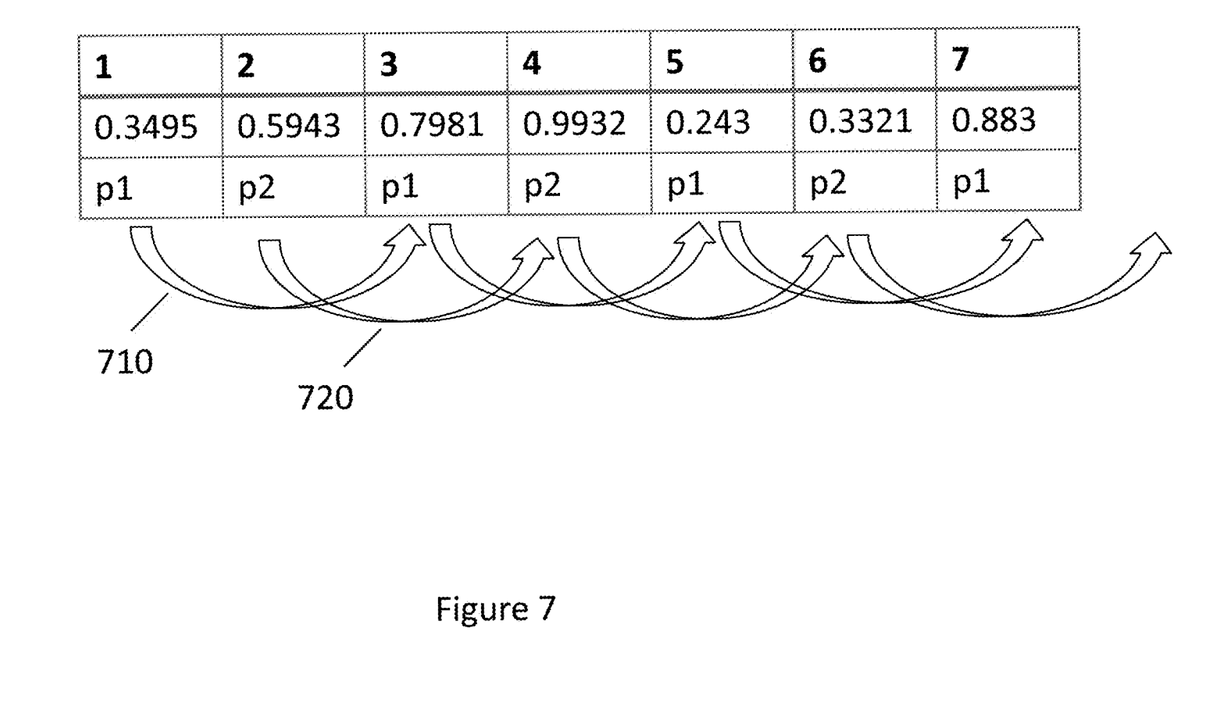
FIG. 7 illustrates a process in accordance with the invention for returning random numbers at different positions in the sequence as the random number generators on different processors advance with the same step size.

Next, in accordance with an embodiment, the step size in the random sequence that each segment uses to return random numbers from the sequence is determined by the number of processes, i.e., slices, spawned by the query planner the master node, i.e., step size=num_process, where num_process is the number of processes (slices). This information is sent to all segments by the master node. Continuing with the same example as above, and referring to FIG. 7, since there are two slices, i.e., processes, p1 and p2, the step size in the sequence on each segment is two positions, as illustrated in FIG. 7 at 710, 720. Thus, as illustrated in the figure, process p1 starts at position 1 in the random number sequence and returns the random number 0.3495. The process then successively steps two positions to positions 3, 5 and 7, respectively to return the random numbers at those positions. Similarly, process p2 starts at position 2 in the random number sequence and returns the random number 0.5943. Process p2 then successively steps two positions in the sequence to return the random numbers at positions 4, 6, etc. By using a step size in the random number sequence corresponding to the number of processes spawned by a particular query to return random numbers, the invention minimizes the likelihood of collisions and correlations between the random numbers returned.

In a MPP distributed database, the number of parallel processes spawned will change based upon the particular incoming query pattern, and this number is known to the master node as a result of the query planning process. By using the query identifier of the incoming query and a seed value, both of which may be stored at the master and by using the number of slices spawned by the query, the same pattern of queries can return consistent random values. The master node sends this information to the segments as part of its normal query dispatching communications so that that each segment generates the same random number sequence. Each segment uses the information from the master node and a segment identifier that is unique to that segment to determine the segment's starting position for returning numbers from the random number sequence. Since each segment has a unique segment identifier, this ensures that each segment starts from a different position in the sequence. By using information sent by the master as to the number of slices as a step size in the sequence, the invention ensures quality, consistent random numbers that are uncorrelated and have a minimum likelihood of collision. This allows each segment to initialize its random number generator with the same starting value and to establish a different starting position in the sequence based upon information that is specific and unique to that segment. Each segment returns random numbers that are consistent, of good quality, are uncorrelated, and do no collide. Advantageously, the invention accomplishes this without the necessity of communicating information between the segments.

While the foregoing has described the invention with respect to a preferred embodiment, it will be appreciated by those skilled in the art that changes this embodiment may be made without departing from the principles and spirit of the invention, the scope of which is defined by the appended claims.

The invention claimed is:

1. A method of generating random numbers on parallel processing segments of a massively parallel processing (MPP) database system, comprising:
dividing, by a master node of the MPP database system, an incoming query received by the master node into slices, each slice having a slice identifier;
dispatching, by the master node and to a plurality of segments for processing:
a total number of segments; and
a slice and a corresponding slice identifier;
generating a same random number sequence on each segment;
establishing on each segment a different starting position in the random number sequence generated on said each segment using the total number of segments, the slice identifier, and a segment identifier of the each segments;
setting a step size that determines return positions in the random number sequence generated on said each segment at which random numbers are returned, the step size being the same on all segments; and
returning uncorrelated random numbers at said return positions in the random number sequence at said segments.

2. The method of claim 1 further comprising dispatching a common seed value to each segment from the master node, and wherein said generating comprises generates the same random number sequence at each segment.

3. The method of claim 2, wherein said dispatching further comprises including with said seed value an identifier related to said query.

4. The method of claim 1, wherein said establishing a different starting position in the random number sequence generated on each segment comprises:
calculating a product of a representation of the slice identifier and the total number of segments;
calculating a sum of the product and the segment identifier of the each segment; and
designating the sum as the starting position on the each segment.

5. The method of claim 1, wherein said establishing a different starting position in the random number sequence generated on each segment comprises calculating the starting position using a calculation pos=(slice_id−1)*num_segment+segment_id, where pos represents the starting position, slice_id represents the slice identifier, num_segment represents the total number of segments, and segment_id represents the segment identifier.

6. The method of claim 5, wherein setting said step size comprises setting the step size using the number of slices.

7. The method of claim 1, wherein setting said step size comprises setting the step size using the number of segments in said database system.

8. Computer readable non-transitory storage medium product embodying instructions for controlling operation of one or more computer processors to generate random numbers on parallel processing segments of a massively parallel processing (MPP) database system, comprising instructions for:
- dividing, by a master node of the MPP database system, an incoming query received by the master node into slices, each slice having a slice identifier;
- dispatching, by the master node and to a plurality of segments for processing:
  - a total number of segments; and
  - a slice and a corresponding slice identifier;
- generating a same random number sequence on each segment;
- establishing on each segment a different starting position in the random number sequence generated on said each segment using the total number of segments, the slice identifier, and a segment identifier of the each segments;
- setting a step size that determines return positions in the random number sequence generated on said each segment at which random numbers are returned, the step size being the same on all segments; and
- returning uncorrelated random numbers at said return positions in the random number sequence at said segments.

9. The computer readable product of claim 8 further comprising instructions for dispatching a common seed value to each segment from the master node, and wherein said generating comprises generates the same random number sequence at each segment.

10. The computer readable product of claim 9, wherein said dispatching further comprises including with said seed value an identifier related to said query.

11. The computer readable product of claim 8, wherein said establishing a different starting position in the random number sequence generated on each segment:
- calculating a product of a representation of the slice identifier and the total number of segments;
- calculating a sum of the product and the segment identifier of the each segment; and
- designating the sum as the starting position on the each segment.

12. The computer readable product of claim 8, wherein said establishing a starting position further comprises calculating the starting position using a calculation pos=(slice_id−1)*num_segment+segment_id, where pos represents the starting position, slice_id represents the slice identifier.

13. The computer readable product of claim 12, wherein setting said step size comprises setting the step size using the number of slices.

14. The computer readable product of claim 8, wherein setting said step size comprises setting the step size using the number of segments in said database system.

15. A massively parallel processing (MPP) database system comprising:
- one or more computer processors; and
- a computer readable non-transitory storage medium product embodying instructions for controlling the one or more computer processors to perform operations comprising:
  - dividing, by a master node of the MPP database system, an incoming query received by the master node into slices, each slice having a slice identifier;
  - dispatching, by the master node and to a plurality of segments for processing:
    - a total number of segments; and
    - a slice and a corresponding slice identifier;
  - generating a same random number sequence on each segment;
  - establishing on each segment a different starting position in the random number sequence generated on said each segment using the total number of segments, the slice identifier, and a segment identifier of the each segments;
  - setting a step size that determines return positions in the random number sequence generated on said each segment at which random numbers are returned, the step size being the same on all segments; and
  - returning uncorrelated random numbers at said return positions in the random number sequence at said segments.

16. The database system of claim 15 further comprising instructions for dispatching a common seed value to each segment from the master node, and wherein said generating comprises generates the same random number sequence at each segment.

17. The database system of claim 16, wherein said dispatching further comprises including with said seed value an identifier related to said query.

18. The database system of claim 15, wherein said establishing a different starting position in the random number sequence generated on each segment:
- calculating a product of a representation of the slice identifier and the total number of segments;
- calculating a sum of the product and the segment identifier of the each segment; and
- designating the sum as the starting position on the each segment.

19. The database system of claim 15, wherein said establishing a starting position further comprises calculating the starting position using a calculation pos=(slice_id−1)*num_segment+segment_id, where pos represents the starting position, slice_id represents the slice identifier.

20. The database system of claim 15, wherein setting said step size comprises setting the step size using the number of slices.

* * * * *